(12) United States Patent
Fahland et al.

(10) Patent No.: US 9,669,885 B1
(45) Date of Patent: Jun. 6, 2017

(54) REGULATION OF DOWNFORCE ON A VEHICLE BODY VIA CONTROL OF AN AIRSTREAM THROUGH A VEHICLE DUCT

(71) Applicant: GM GLOBAL TECHNOLOGY OPERATIONS LLC, Detroit, MI (US)

(72) Inventors: Jason D. Fahland, Fenton, MI (US); Joshua R. Auden, Brighton, MI (US); David Dominguez, Tucson, AZ (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/959,917

(22) Filed: Dec. 4, 2015

(51) Int. Cl.
*B62D 35/00* (2006.01)
*B62D 37/02* (2006.01)

(52) U.S. Cl.
CPC ........... *B62D 37/02* (2013.01); *B62D 35/005* (2013.01)

(58) Field of Classification Search
CPC ...... B62D 35/00; B62D 35/02; B62D 35/005; B62D 37/02
See application file for complete search history.

(56) References Cited

U.S. PATENT DOCUMENTS

| | | | | |
|---|---|---|---|---|
| 4,379,582 A | * | 4/1983 | Miwa | B62D 35/005 293/113 |
| 5,184,832 A | * | 2/1993 | Miwa | B62D 35/005 280/848 |
| 2010/0243351 A1 | * | 9/2010 | Sakai | B60K 11/085 180/68.1 |
| 2012/0024611 A1 | * | 2/2012 | Ajisaka | B60K 11/08 180/68.1 |
| 2013/0059519 A1 | * | 3/2013 | Tajima | B60K 11/04 454/152 |
| 2013/0110356 A1 | * | 5/2013 | Konishi | B60K 11/085 701/49 |
| 2014/0262644 A1 | * | 9/2014 | Browne | B60T 5/00 188/264 AA |
| 2014/0265432 A1 | * | 9/2014 | Kimura | B62D 35/02 296/180.1 |
| 2014/0378043 A1 | * | 12/2014 | Mueller | B62D 25/16 454/152 |
| 2015/0232138 A1 | * | 8/2015 | Parry-Williams | B62D 35/02 296/180.5 |
| 2015/0307065 A1 | * | 10/2015 | Kim | B60S 1/52 296/180.1 |

(Continued)

*Primary Examiner* — Gregory Blankenship
(74) *Attorney, Agent, or Firm* — Quinn IP Law

(57) ABSTRACT

A system is disclosed for controlling an incident ambient airflow in a vehicle. The vehicle includes a vehicle body with a first vehicle body end configured to face the incident ambient airflow when the vehicle is in motion relative to a road surface. The system includes a duct providing a conduit for the incident airflow into the vehicle body. The system also includes a shutter assembly configured to control the airflow through the duct and thereby regulate a downforce acting on the first vehicle body end. The shutter assembly may include an adjustable louver, a mechanism configured to select the position for the louver between and inclusive of fully opened and fully closed, and a controller configured to regulate the mechanism. The vehicle may also have a heat-absorbing subassembly, and the duct can provide a conduit for the incident airflow to the heat-absorbing subassembly for cooling thereof.

13 Claims, 3 Drawing Sheets

(56) References Cited

U.S. PATENT DOCUMENTS

| | | | | |
|---|---|---|---|---|
| 2015/0322845 A1* | 11/2015 | Nam | .................... | F02B 29/0443 123/41.21 |
| 2015/0345578 A1* | 12/2015 | Nightingale | ......... | B60K 11/085 188/264 AA |
| 2015/0353149 A1* | 12/2015 | Wolf | .................... | B62D 35/007 296/180.5 |
| 2016/0016617 A1* | 1/2016 | Wolf | ...................... | B62D 37/02 296/208 |
| 2016/0052513 A1* | 2/2016 | Ishiba | .................... | B60W 30/02 701/41 |
| 2016/0176450 A1* | 6/2016 | Wolf | ...................... | B62D 35/00 180/68.2 |
| 2016/0244107 A1* | 8/2016 | Ishiba | .................... | B62D 35/02 |
| 2016/0244108 A1* | 8/2016 | Tsuruta | .................. | B62D 35/02 |
| 2016/0272258 A1* | 9/2016 | Gibson | ................. | F16D 65/847 |

\* cited by examiner

REGULATION OF DOWNFORCE ON A VEHICLE BODY VIA CONTROL OF AN AIRSTREAM THROUGH A VEHICLE DUCT

TECHNICAL FIELD

The disclosure relates to control of an airstream through a duct in a vehicle for regulation of downforce on the vehicle's body.

BACKGROUND

Aerodynamics is a significant factor in vehicle design, including automobiles. Automotive aerodynamics is the study of the aerodynamics of road vehicles. The main goals of the study are reducing drag and wind noise, minimizing noise emission, and preventing undesired lift forces and other causes of aerodynamic instability at high speeds. Additionally, the study of aerodynamics may also be used to achieve downforce in vehicles in order to improve vehicle traction, high speed stability, and cornering. The study is typically used to shape vehicle bodywork for achieving a desired compromise among the above characteristics for specific vehicle use.

SUMMARY

A system is disclosed for controlling an incident ambient airflow in a vehicle. The vehicle includes a vehicle body with a first vehicle body end configured to face the incident ambient airflow when the vehicle is in motion relative to a road surface. The system includes a duct providing a conduit for the incident airflow into the vehicle body. The system also includes a selectable position shutter assembly configured to control the airflow through the duct and thereby regulate a downforce acting on the first vehicle body end.

The shutter assembly includes an adjustable louver, and may include a mechanism configured to select a position for the louver between and inclusive of fully opened and fully closed, and a controller configured to regulate the mechanism.

The vehicle may also have a heat-absorbing subassembly, and the duct can provide a conduit for the incident airflow to cool the heat-absorbing subassembly.

The vehicle may include a rotatable road wheel arranged proximate to the first vehicle body end. In such a case, the heat-absorbing subassembly may be a brake subassembly configured to retard rotation of the road wheel.

The first vehicle body end may include a fascia defining an opening that is in fluid communication with the duct.

The mechanism may be configured to rotate the adjustable louver relative to the fascia in order to control the size of the opening and selectively restrict passage of the incident airflow through the duct.

The adjustable position louver may have an airfoil shape in a cross-sectional view.

The system may also include a first sensor configured to detect a road speed of the vehicle and communicate the detected road speed to the controller, a second sensor configured to detect a yaw rate of the vehicle body and communicate the detected yaw rate to the controller.

The regulation of the mechanism by the controller may be configured to select the position for the adjustable louver between and inclusive of fully opened and fully closed in response to the detected road speed of the vehicle.

The system may additionally include a steering wheel configured to control a direction of the vehicle via a steering wheel angle and a third sensor configured to detect the steering wheel angle and communicate the detected steering wheel angle to the controller.

The regulation of the mechanism by the controller may be configured to select the position for the adjustable louver between and inclusive of fully opened and fully closed in response to the detected yaw rate and steering wheel angle.

A vehicle employing the described system for controlling the incident ambient airflow through the duct to regulate a downforce acting on the vehicle body is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
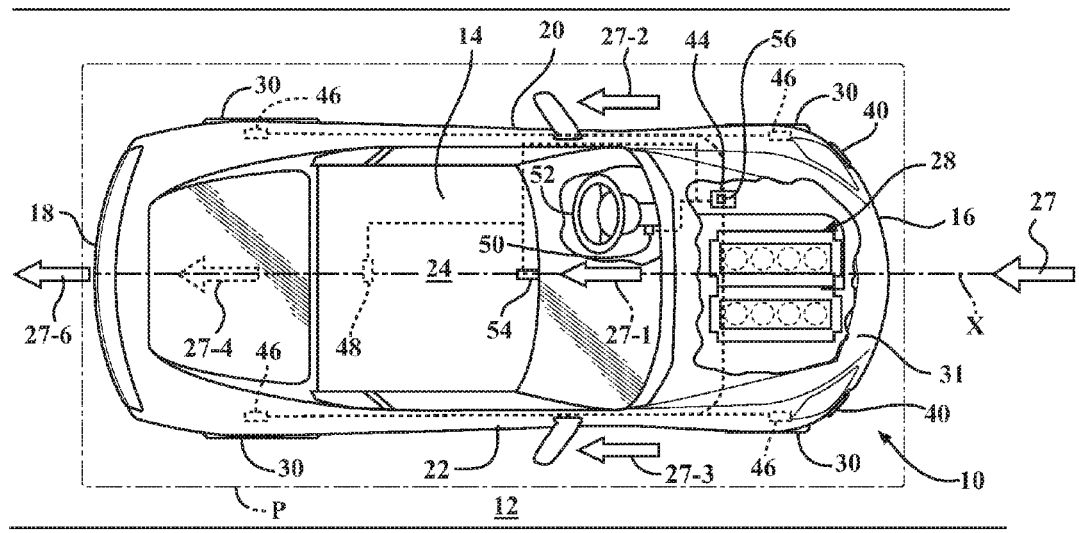
FIG. 1 is a schematic top view of a vehicle having vehicle body, brake subassemblies configured to retard rotation of respective road wheels, and a shutter assembly with an adjustable position louver for controlling an incident airflow through a brake duct according to the disclosure.
Figure 2:
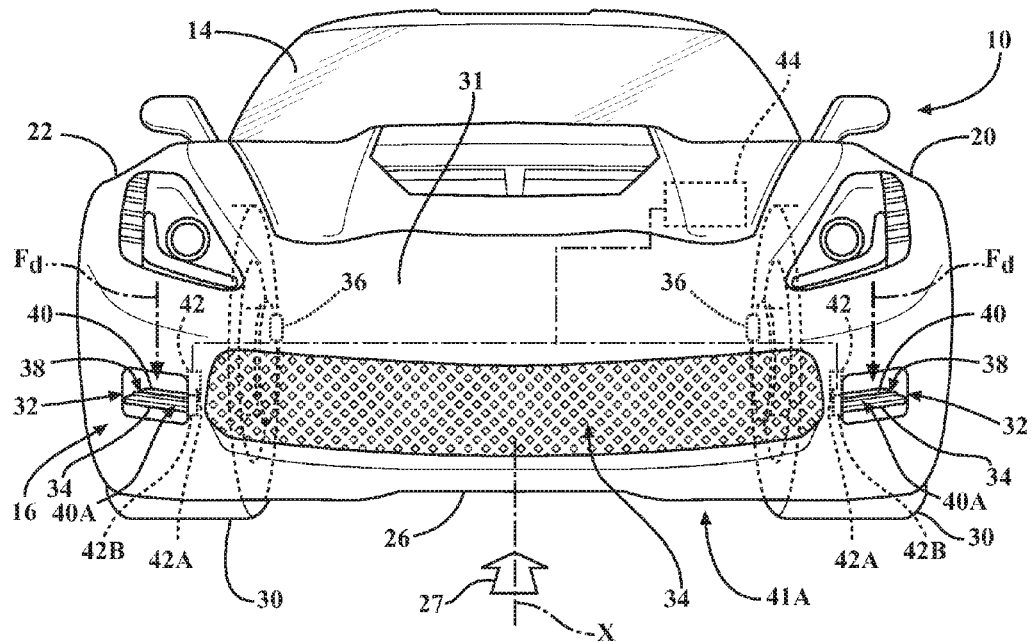
FIG. 2 is a schematic front view of the vehicle with the shutter assembly louver in a fully open position according to the disclosure.

Referring to the drawings, wherein like reference numbers refer to like components, FIG. 1 shows a schematic view of a motor vehicle 10 positioned relative to a road surface 12. The vehicle 10 includes a vehicle body 14 arranged along a virtual longitudinal axis X in a body plane P that is substantially parallel to the road surface 12. The vehicle body 14 defines six body sides. The six body sides include a first body end or front end 16, an opposing second body end or rear end 18, a first lateral body side or left side 20, and a second lateral body side or right side 22, a top body portion 24, which may include a vehicle roof, all shown in FIG. 1, and an underbody portion 26, shown in FIGS. 2-5.

The left side 20 and right side 22 are disposed generally parallel to each other and with respect to the longitudinal axis X, and span the distance between the front end 16 and the rear end 18. The body plane P is defined to include the longitudinal axis X. A passenger compartment (not shown) of the vehicle 10 is generally bounded by the front and rear ends 16, 18 and the left and right sides of the body 14. As understood by those skilled in the art, the front end 16 is configured to face an oncoming or incident ambient airflow 27 when the vehicle 10 is in motion relative to the road surface 12. When the vehicle 10 is in motion, the oncoming ambient airflow 27 moves substantially parallel to the body plane P and along the longitudinal axis X.

As shown, the vehicle 10 also includes a powerplant 28, such as an internal combustion engine, a hybrid-electric powertrain (not shown), or other alternative types of propulsion systems. As the vehicle 10 moves relative to the road surface 12, for example under torque input from the powerplant 28, the ambient airflow 27 passes around the vehicle body 14 and splits into respective first airflow portion 27-1, second airflow portion 27-2, third airflow portion 27-3, and fourth airflow portion 27-4, that eventually rejoin in a wake area or recirculating airflow region 27-6 immediately behind the rear end 18. Specifically, as shown in FIG. 1, the first airflow portion 27-1 passes over the top body portion 24, second airflow portion 27-2 passes over the left side 20, third airflow portion 27-3 passes over the right side 22, and fourth airflow portion 27-4 passes under the vehicle body 14, between the underbody portion 26 and the road surface 12. As understood by those skilled in the art, the recirculating airflow region 27-6 is generally caused at elevated vehicle speeds by the flow of surrounding air around the six body sides of the vehicle body 14.

As shown in FIGS. 1-5, the vehicle 10 also includes road wheels 30 arranged proximate to the front end 16. The front end 16 includes a fascia 31. The fascia 31 defines an opening 32 in fluid communication with a duct 34. The duct 34 provides a conduit for the incident airflow 27 into the vehicle body 14 and for cooling a heat-absorbing subassembly. The vehicle 10 typically includes a plurality of such heat-absorbing subassemblies, i.e., various mechanisms and devices configured to perform varied vehicle functions and during the course of their operation absorb heat energy. A representative heat-absorbing subassembly may, for example, be an electric motor or a heat exchanger for a Heat Ventilation and Air Conditioning (HVAC) system (not shown, but known by those skilled in the art), or a brake subassembly 36 configured to retard rotation of a respective road wheel 30.

As understood by those skilled in the art, the disclosed brake subassembly 36 can be a mechanical device designed to inhibit motion by using friction to convert kinetic energy into heat. On vehicles, during extended brake applications, such as occur when vehicle motion is retarded from elevated road speeds, the brake subassembly 36, may experience extensive accumulation of heat. Although, as noted above, the heat-absorbing subassemblies can be various subassemblies arranged on the vehicle 10, for simplicity, further disclosure will concentrate specifically on the brake subassembly 36 for the road wheel 30 arranged proximate to the front end 16.

Figure 6:
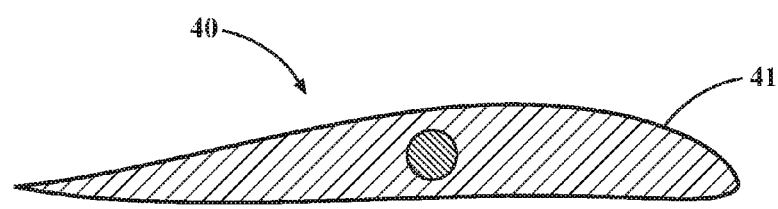
FIG. 6 is a schematic cross-sectional view of the louver's outer surface having an airfoil shape.
Figure 4:
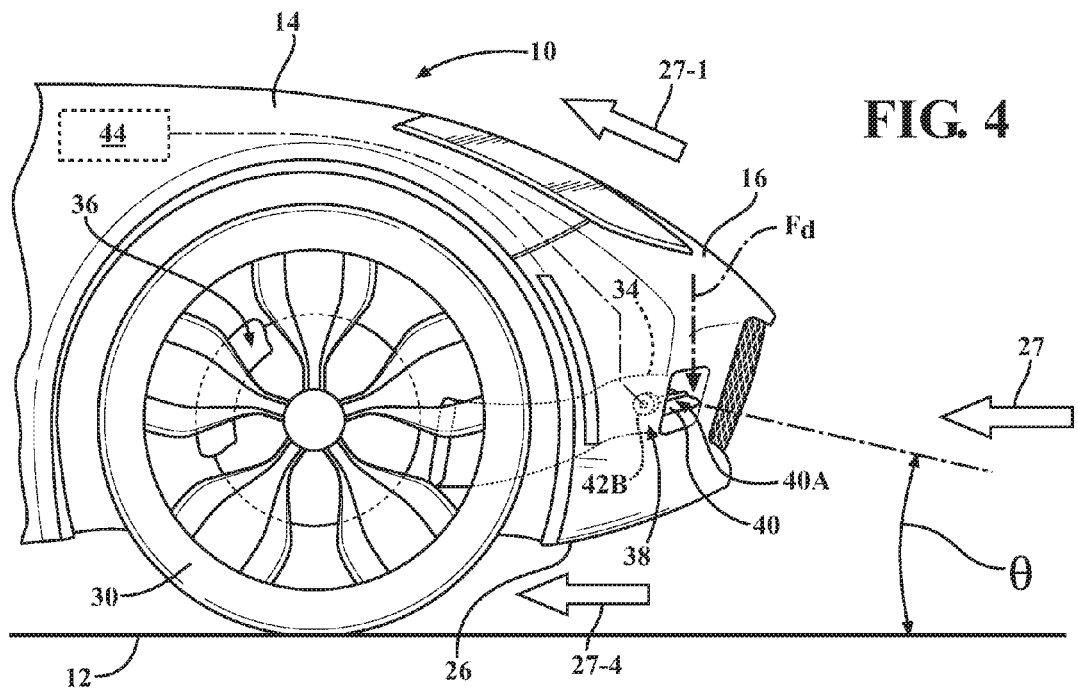
FIG. 4 is a schematic partial side view of the vehicle with the shutter assembly louver arranged in one duct portion and shown in a first partially open position according to the disclosure.
Figure 5:
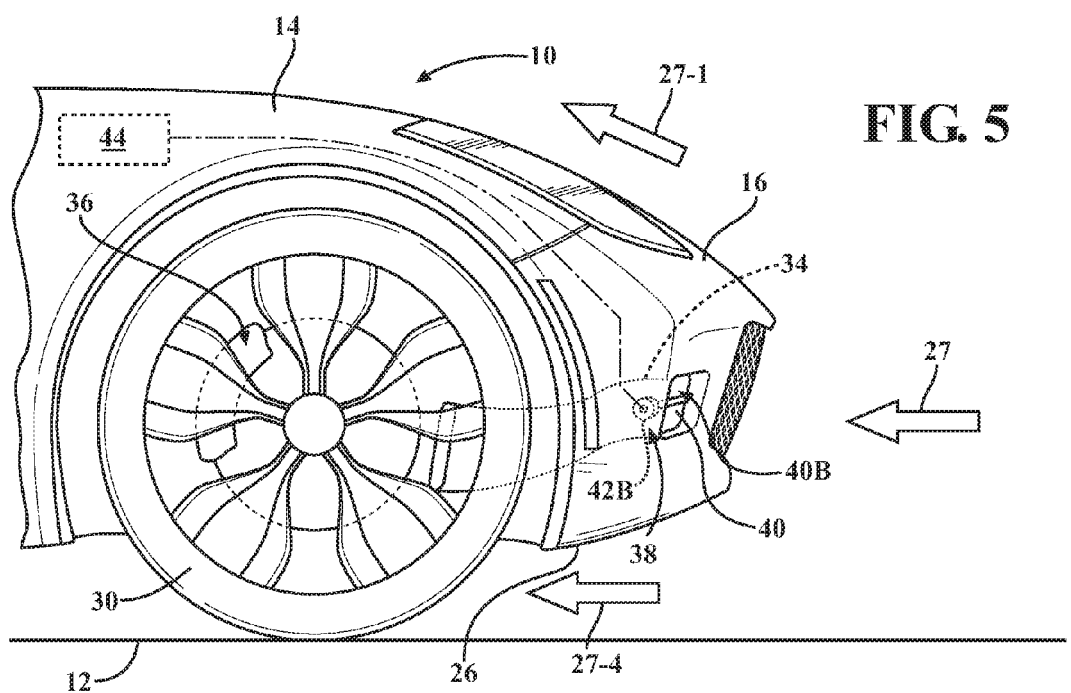
FIG. 5 is a schematic partial side view of the vehicle with the shutter assembly louver arranged in another duct portion and shown in a second partially open position according to the disclosure.

As shown in FIGS. 1 and 4-5, the duct 34 is configured to channel the incident airflow 27 to the brake subassembly 36 for cooling thereof and return the incident airflow to the ambient aft of the brake subassembly. The vehicle also includes a selectable position shutter assembly 38 configured to control the size of the opening 32 to the duct 34 to thereby control a flow of the incident airflow 27 through the duct. The shutter assembly 38 includes at least one adjustable louver 40. Each of the adjustable louvers 40 may be wing-shaped. "Wing-shaped" is herein defined as having a shape of a wing, i.e., a fin having a shape of an airfoil. In a cross-sectional view of the representative louver 40, as seen in FIG. 6, the subject airfoil is identified via numeral 41 and is defined by a streamlined shape producing lift for flight or propulsion through a fluid.

The shutter assembly 38 also includes a mechanism 42 configured to select the position for the adjustable louvers 40 between and inclusive of fully opened and fully closed. Specifically, the mechanism 42 can be configured to rotate the at least one louver 40 and thereby selectively restrict passage of the incident airflow 27 through the duct 34. The shutter assembly 38 also includes a controller 44 configured to regulate the mechanism 42. To effect the desired rotation of the louvers 40, as shown in FIGS. 1-5, the mechanism 42 may additionally include an electric motor 42A, a gear-train 42B, and/or other force transmitting arrangements.

The controller 44 may be configured, i.e., constructed and programmed, to regulate the mechanism 42 and thereby vary the position of the adjustable louvers 40 relative to the duct 34 and the front end 16. The controller 44 may include a central processing unit (CPU) of the vehicle 10, and thus configured to regulate operation of the powerplant 28, as well as other vehicle systems, or a dedicated controller. In order to appropriately control operation of the mechanism 42, the controller 44 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 44 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 44 may also include a floppy disk, a flexible disk, hard disk, magnetic tape, any other magnetic medium, a CD-ROM, DVD, any other optical medium, etc. The controller 44 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 44 or accessible thereby may be stored in the memory and automatically executed to provide the required functionality.

As shown in FIG. 1, a plurality of first sensors 46 may be arranged on the vehicle body 14 for detecting rotating speeds of each road wheel 30. Each first sensor 46 may also be configured to communicate the detected rotating speed of the respective road wheel 30 to the controller 44, while the controller may be configured to correlate the data received from the respective first sensors to road speed of the vehicle 10. The vehicle 10 may also include a second sensor 48 (shown in FIG. 1) configured to detect a yaw moment or rate on the vehicle body 14 relative to the road surface 12 and communicate the detected yaw rate to the controller 44. Additionally, the vehicle 10 may include a third sensor 50 operatively connected to a steering wheel 52 (shown in FIG. 1) and configured to detect an angle of the steering wheel during operation of the vehicle. An intended direction of the vehicle 10 may be identified by the steering wheel angle detected by the third sensor 50 and communicated to the controller 44.

As shown in FIG. 1, the vehicle may additionally include a fourth sensor 54 configured to detect a velocity of the incident ambient airflow 27 relative to the vehicle 10. The fourth sensor may be additionally configured to communicate the detected velocity of the incident ambient airflow 27 to the controller 44 for correlation of the airflow velocity to road speed of the vehicle 10. Such a fourth sensor 54 may, for example, be a pitot tube configured to detect a pressure of the ambient airflow 27 at a specific location relative to the vehicle body 14 and the controller 44 can correlate the measured pressure to airflow velocity.

Figure 3:
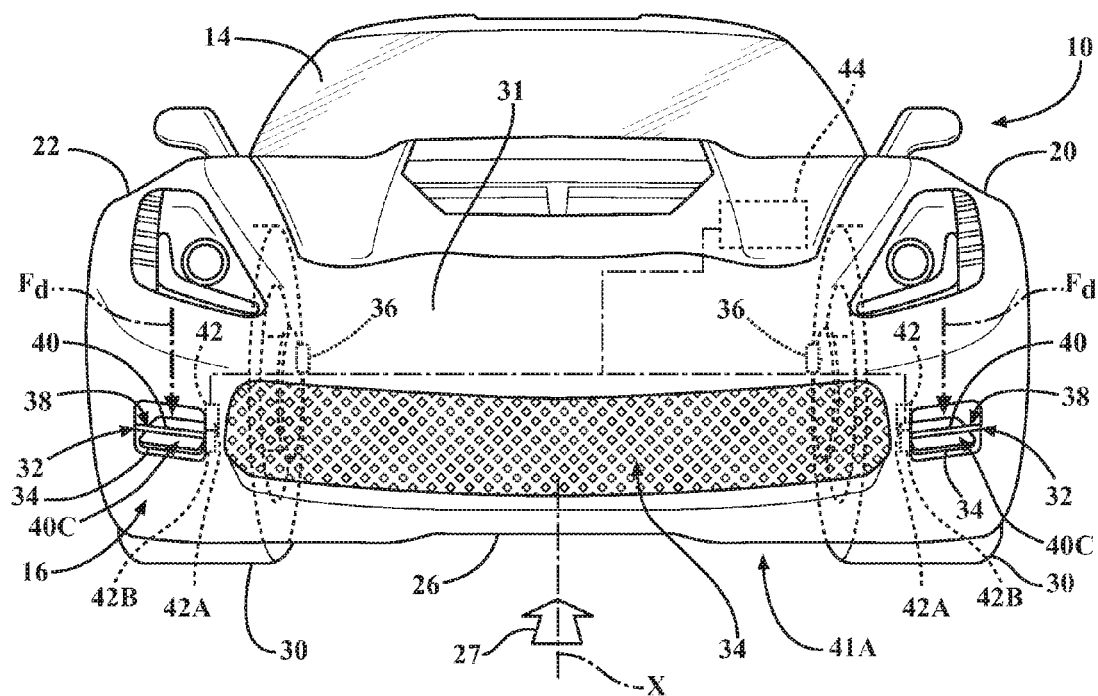
FIG. 3 is a schematic front view of the vehicle with the shutter assembly louver in a fully closed position according to the disclosure.

By regulating the mechanism 42, the controller 44 can shift position of the adjustable louvers 40 between and inclusive of fully opened 40A (shown in FIG. 4) and fully closed 40B (shown in FIG. 5) to control the size of an opening 32 to the duct 34 and thereby regulate the flow of the incident airflow 27 through the duct. Specifically, regulation of the adjustable louvers 40 to a position 40C, toward position 40A but without fully closing the duct 34, as shown in FIG. 3, is effective in increasing the downforce $F_d$ and thereby increasing the detected yaw rate. Conversely, the controller 44 can regulate the mechanism 42 to shift the louvers 40 to the position 40B, shown in FIG. 5, thereby decreasing the downforce $F_d$ along with the detected yaw rate, with the additional consequence of decreasing the aerodynamic drag on the vehicle body 14.

Accordingly, the controller 44 may be configured to vary an angle θ (shown in FIGS. 4-5) of the adjustable louvers 40 with respect to the road surface 12 in response to the rotating speeds of the road wheels 30 detected via the first sensor 46 and/or the velocity of the ambient airflow 27 detected via the fourth sensor 54. Furthermore, the angle θ of the adjustable louvers 40 can be controlled proportionately to the yaw rate generated during cornering of vehicle 10 by selectively operating the mechanism 42. The controller 44 may be programmed with a look-up table 56 (shown ion FIG. 1) establishing correspondence between the vehicle yaw rate, vehicle road speed, and/or velocity of the airflow and the angle θ of the adjustable louvers 40 for affecting appropriate regulation of the mechanism 42. The look-up table 56 may be developed empirically during validation and testing of the vehicle 10. According to the disclosure, an angle θ of around 45 degrees generates the greatest downforce $F_d$ on the front end 16, while an angle θ of around 0 degrees or 90 degrees generates minimal downforce.

The controller 44 may be additionally programmed to determine a slip of the vehicle 10 relative to the road surface 12. The slip of the vehicle 10 may include a measure of how much each of the road wheels 30 has slipped in a direction that is generally perpendicular to the longitudinal vehicle axis X, which identifies that the vehicle has deviated from the intended direction or path along the road surface 12 as identified by the steering wheel angle detected by the third sensor 50. The controller 44 may be programmed to compare the determined steering wheel angle and yaw rate to determine how much the vehicle had deviated from its intended direction or path.

The controller 44 may also be programmed to control the slip of the vehicle 10 relative to the road surface 12 by selectively regulating the angle θ of the adjustable louvers 40 via the mechanism 42 in response to how much the vehicle has deviated from its intended path. The altered the angle θ of the adjustable louvers 40 relative to the road surface 12 then urges the vehicle 10 to return to the actual vehicle heading to the desired heading being commanded by an operator of the vehicle at the steering wheel 52. Accordingly, as the angle θ of the adjustable louvers 40 is varied during the cornering event, the shutter assembly 38 positioned at the front end 16 is able to use the ambient airflow 27 more effectively in order to maximize the downforce $F_d$ at the front end of the vehicle body 14.

According to the above description, regulation of the position of the adjustable louvers 40 may be employed to maintain contact of the vehicle 10 with the road surface 12 at elevated vehicle speeds by countering aerodynamic lift of the vehicle body 14 at the front end 16 in response to the velocity of ambient airflow 27 detected by the third sensor 50. Additionally, regulation of the position of the adjustable louvers 40 may be employed to aid handling of the vehicle 10 in order to maintain the vehicle on its intended path by countering the yaw moment acting on the vehicle body 14 as detected by the second sensor 48.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A system for controlling an incident ambient airflow in a vehicle, the vehicle including a vehicle body having a first vehicle body end configured to face the incident ambient airflow when the vehicle is in motion relative to a road surface, the system comprising:
   a duct providing a conduit for the incident airflow into the vehicle body; and
   a selectable position shutter assembly configured to control the incident ambient airflow through the duct and thereby regulate a downforce acting on the first vehicle body end, the selectable position shutter assembly including:
      an adjustable louver;
      a mechanism configured to select a position for the adjustable louver between and inclusive of fully opened and fully closed;
   a controller configured to regulate the mechanism;
   a first sensor configured to detect a road speed of the vehicle and communicate the detected road speed to the controller;
   a second sensor configured to detect a yaw rate of the vehicle body and communicate the detected yaw rate to the controller;
   a steering wheel configured to control a direction of the vehicle via a steering wheel angle; and
   a third sensor configured to detect the steering wheel angle and communicate the detected steering wheel angle to the controller;
   wherein the controller is configured to regulate the mechanism by selecting the position for the adjustable louver between and inclusive of fully opened and fully closed in response to the detected road speed of the vehicle, the detected yaw rate, and the detected steering wheel angle.

2. The system of claim 1, wherein the vehicle includes a heat-absorbing subassembly and the duct provides a conduit for the incident ambient airflow to cool the heat-absorbing subassembly.

3. The system of claim 2, wherein the vehicle includes a rotatable road wheel arranged proximate to the first vehicle body end, wherein the heat-absorbing subassembly is a brake subassembly configured to retard rotation of the road wheel.

4. The system of claim 1, wherein the first vehicle body end includes a fascia defining an opening in fluid communication with the duct.

5. The system of claim 4, wherein the adjustable louver is configured to control the size of the opening.

6. The system of claim 4, wherein the mechanism is configured to rotate the adjustable louver relative to the fascia.

7. The system of claim 1, wherein the adjustable louver has an airfoil shape in a cross-sectional view.

8. A vehicle comprising:
- a vehicle body having a first vehicle body end configured to face incident ambient airflow when the vehicle is in motion relative to a road surface;
- a heat-absorbing subassembly arranged proximate to the first vehicle body end;
- a duct providing a conduit for the incident airflow to cool the heat-absorbing subassembly; and
- a selectable position shutter assembly having an adjustable louver configured to control the incident ambient airflow through the duct and thereby regulate a downforce acting on the first vehicle body end;
- a mechanism configured to select the position for the adjustable louver between and inclusive of fully opened and fully closed;
- a controller configured to regulate the mechanism;
- a first sensor configured to detect a road speed of the vehicle and communicate the detected road speed to the controller;
- a second sensor configured to detect a yaw rate of the vehicle body and communicate the detected yaw rate to the controller;
- a steering wheel configured to control a direction of the vehicle via a steering wheel angle; and
- a third sensor configured to detect the steering wheel angle and communicate the detected steering wheel angle to the controller;
- wherein the controller is configured to regulate the mechanism by selecting the position for the adjustable louver between and inclusive of fully opened and fully closed in response to the detected road speed of the vehicle, the detected yaw rate, and the detected steering wheel angle.

9. The system of claim 8, wherein the vehicle includes a rotatable road wheel arranged proximate to the first vehicle body end, and wherein the heat-absorbing subassembly is a brake subassembly configured to retard rotation of the road wheel.

10. The vehicle of claim 8, wherein the first vehicle body end includes a fascia defining an opening in fluid communication with the duct.

11. The vehicle of claim 10, wherein the adjustable louver is configured to control the size of the opening.

12. The vehicle of claim 10, wherein the mechanism is configured to rotate the adjustable louver relative to the fascia.

13. The vehicle of claim 8, wherein the adjustable louver has an airfoil shape in a cross-sectional view.

* * * * *